C. E. AKELEY.
MIRROR AND METHOD OF BACKING THE SAME.
APPLICATION FILED MAR. 19, 1919.
1,342,578.
Patented June 8, 1920.
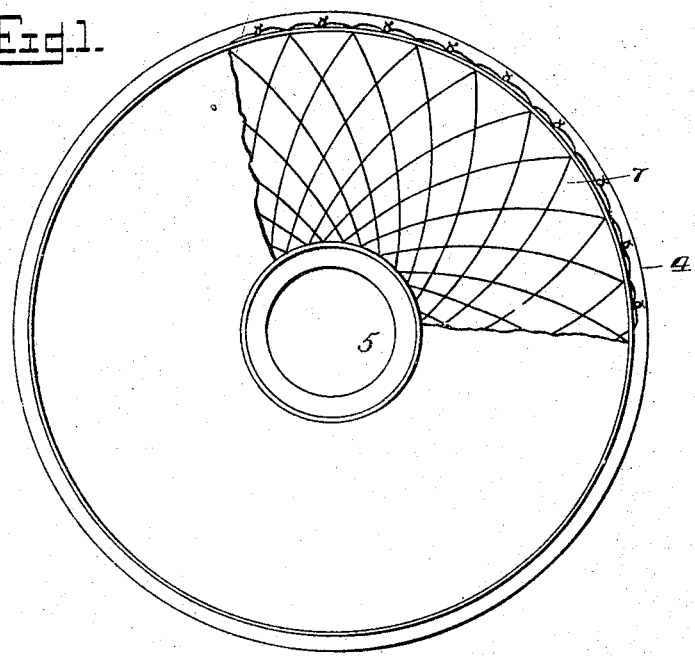
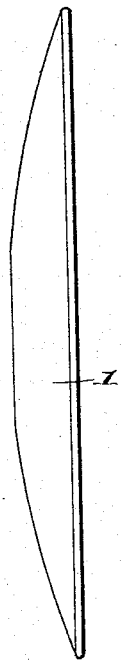
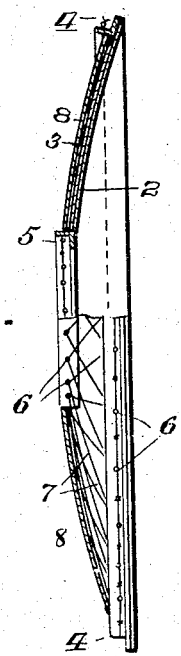
Inventor
Carl E. Akeley

UNITED STATES PATENT OFFICE.

CARL E. AKELEY, OF NEW YORK, N. Y.

MIRROR AND METHOD OF BACKING THE SAME.

1,342,578. Specification of Letters Patent. Patented June 8, 1920.

Application filed March 19, 1919. Serial No. 283,644.

(FILED UNDER THE ACT OF MARCH 3, 1883, 22 STAT. L., 625.)

*To all whom it may concern:*

Be it known that I, CARL E. AKELEY, a citizen of the United States, and a resident of New York city, in the county of New York and State of New York, have invented an Improvement in Mirrors and Methods of Backing the Same, of which the following is a specification.

The invention described herein may be used by the Government, or any of its officers or employees in prosecution of work for the Government, or by any other person in the United States without payment of any royalty thereon.

My invention relates to reflectors or mirrors and has for its object to provide a novel means and method for backing the same that is particularly adapted for use in connection with metal mirrors.

Metal mirrors, as previously formed, have comprised a reflecting surface, such as silver, and a supporting base therefor, such as copper. The usual method of forming such mirrors is to chemically deposit the silver upon a glass form and then to electrolytically deposit a thin layer of copper thereon, after which, the metal mirror is removed from the glass form.

It is obvious that metal mirrors so formed are much lighter in weight and less expensive than glass mirrors of the same size, since the form for each glass mirror must be carefully ground to insure an optically perfect reflecting surface, whereas, an unlimited number of metal mirrors may be made from a single glass form.

In making metal mirrors of large diameter, however, it has been found that when only a thin base of copper or other metal is provided, the mirror is easily bent or dented. In order to provide a mirror of sufficient rigidity to be self supporting, it is therefore necessary to deposit the base metal in a very heavy layer, so that the weight and the cost of the mirror is greatly increased and but little advantage is gained over glass mirrors, as previously formed.

By my invention, I provide a novel form and method of backing, which when applied to a metal mirror, results in an integral self supporting structure that can be handled without fear of distortion of or damage to the reflecting surface.

In the accompanying drawings:

Figure 1 is a rear elevation of a mirror provided with my improved form of backing, portions thereof being broken away to clearly show the reinforcing members.

Fig. 2 is a side elevation of a blank form used in producing a metal mirror.

Fig. 3 is a view partially in section and partially in side elevation, portions of the backing being broken away, as in Fig. 1.

Referring now to the drawings, in forming a mirror to which my backing is to be applied, a blank form 1 of the desired shape and size is provided, upon which is deposited first a metallic reflecting surface 2, such as silver, and then a layer 3 of suitable metal, such as copper, to form a base for the silver. The exact method of depositing the metals forms no part of my invention and need not be further described herein.

Rings 4 and 5, which are preferably in the form of angles, respectively having one leg bent to conform to the curvature of the mirror, are placed upon the back of the mirror in concentric relation and a layer of cementitious material 8 is applied to the back of the mirror, which serves to temporarily hold the rings 4 and 5 in position. The parallel legs of the rings 4 and 5 are respectively provided with openings 6 and a plurality of lengths of wire, 7 are passed through the openings 6 to form a loose network between the rings 4 and 5, which rests upon the layer of cementitious material 8. The space between the rings 4 and 5 is then filled in by more cementitious material 8, which then completely covers the wire 7.

After the cementitious material 8 has set, the end portions of the wire 7, that project beyond the rings 4 and 5, are bent over and twisted together. As the cementitious material, with the wire 7 embedded therein, adheres to the back of the mirror, the rings 4 and 5 become substantially an integral part of the backing without being actually secured to the mirror at any point. The entire structure may then be removed from the form 1.

From the foregoing, it is apparent that a metal mirror with my backing applied thereto is a rigid self supporting structure that may be handled without fear of distorting the reflecting surface of the mirror, With the mirror supported by either of the rings 4 or 5, the weight of the mirror is borne by the mesh of wire reinforcing members between the rings, so that the mirror is not subjected to any direct strains. By the use of my invention, a relatively thin mirror can be employed with a consequent saving of weight and material.

I claim as my invention:

1. A mirror provided with a plurality of rigid supporting members that are secured thereto by means of a mesh extending between the supporting members and embedded in cementitious material.

2. The method of backing a mirror which consists in, first placing a plurality of concentric annular members in said mirror, then forming a wire mesh between said members and finally in embedding said mesh in cementitious material.

3. The method of backing a mirror comprising a reflecting surface and a metallic base which consists in, first placing annular reinforcing members on said metallic base, then interlacing wire between the reinforcing members and finally in placing cementitious material between said reinforcing means to completely cover the wires.

4. A mirror comprising a metal base and a reflecting surface deposited on said base, rings in contact with the base, wire interlacings between said rings and cementitious material between said rings in which said wire interlacings are wholly embedded.

5. A mirror comprising a relatively thin metal base, a reflecting surface deposited on said metal base, rings in contact with the said metal base, wires interlaced between said rings, and a cementitious material between said rings, the said wires being embedded therein.

CARL E. AKELEY.